Sept. 26, 1933.                H. LAWARREE                1,928,540
              PROCESS FOR THE MANUFACTURE OF SODIUM BICARBONATE
                              Filed Feb. 3, 1932
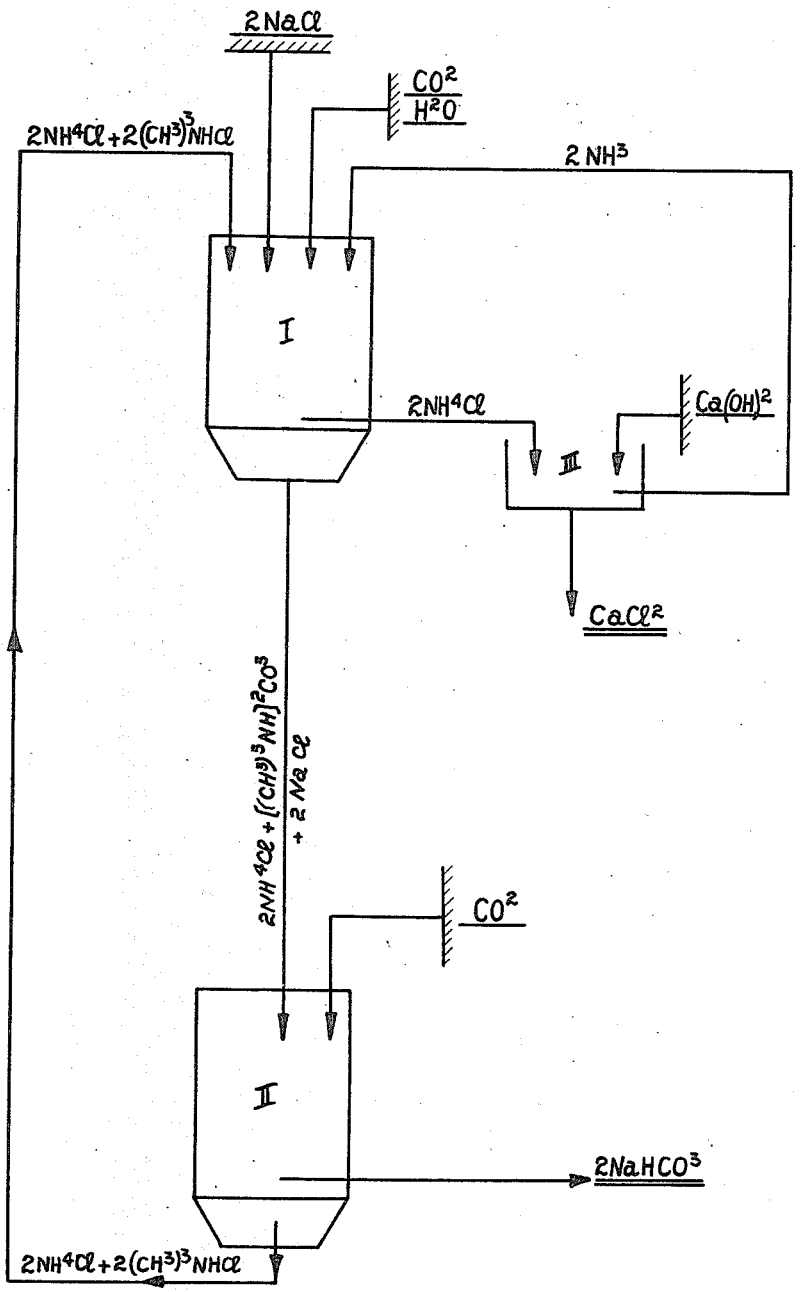
Inventor:
Henri Lawarree Patented Sept. 26, 1933

1,928,540

UNITED STATES PATENT OFFICE 1,928,540

PROCESS FOR THE MANUFACTURE OF SODIUM BICARBONATE

Henri Lawarrée, Brussels, Belgium

Application February 3, 1932, Serial No. 590,716, and in Germany February 16, 1931

6 Claims. (Cl. 23—65)

The present invention relates to a cyclic process for the manufacture of sodium bicarbonate starting with a sodium salt such as sodium chloride.

The use of trimethylamine for the manufacture of alkaline carbonates has itself already been proposed particularly in the processes forming the object of German Patents Nos. 5,786, 9,376 and 13,397.

However, a practical process based on this concept has not as yet been devised because in accordance with the known processes it is necessary to treat the residue obtained after the precipitation of the sodium bicarbonate.

This treatment has up until the present rendered the use of trimethylamine for the manufacture of sodium bicarbonate practically impossible.

According to the present invention, I utilize a solution circulating in a cycle and which contains jointly the soluble salts of methylamine and ammonia.

As salts of methylamines, I provide for the use of salts of mono, di or trimethylamines or mixtures of these salts.

I add to the solution, the soluble sodium salt to be transformed into bicarbonate, in the presence of $CO_2$ and ammonia or ammonium carbonates which will effect the precipitation of a quantity of ammonium salt practically corresponding to the total amount of sodium salt introduced, after which I eliminate this precipitate and introduce into the filtrate, $CO_2$ or ammonia and $CO_2$ for precipitating sodium bicarbonate with regeneration of the separated solution of salts of methylamines and ammonia.

According to a particular method of carrying out the invention, there is employed in a cycle a solution of a salt of methylamine and a sodium salt, which is kept saturated with $NH_4Cl$. In this manner the ammonium chloride formed by the double decomposition above mentioned is precipitated and is eliminated by filtration.

By transforming the carbonates of trimethylamines into bicarbonates by means of gaseous $CO_2$ or ammonium carbonates, respectively, $CO_2$ and ammonia gas, there is obtained the precipitation of sodium bicarbonate by the joint action of the bicarbonate of the methylamine, and of bicarbonate of ammonia in presence of a single salt of sodium such as the chloride. After filtration of the bicarbonate of sodium precipitated, there is re-introduced into the cycle without any treatment, the residual solution, which is saturated with salts of trimethylamines and of ammonium, such as the chlorides formed from the original sodium salt, and from the sodium salt submitted to bicarbonation. The role of the salts of the substituted trimethylamines is to render complete reactions which are only partial with ammonium salts alone.

Other details of the invention will appear in the course of the description of the two examples below and of the appended diagram, which represent by way of example only, a method of realization of the invention.

Example 1

In the vessel I there is introduced a solution containing 94 kg. of sodium chloride, 190 kg. of trimethylamine chloride, and 198 kg. of ammonium chloride per cubic meter (corresponding to saturation in the case of this latter salt). The 94 kg. of NaCl does not take an active part in the reactions and is once for all introduced at the start of the cyclic operation after which it circulates in a cycle with the vehicular solution. There is added to the solution 140 kg. of fresh sodium chloride and 156 kg. of neutral carbonate of ammonium $(NH_4)_2CO_3$ in the form of $NH_3$, $CO_2$ and washing water from a previous operation. There is precipitated about 125–130 kg. of ammonium chloride, practically pure, corresponding substantially to the 140 kg. of sodium chloride freshly introduced.

After filtration of this ammonium chloride, the solution contains trimethylamine carbonates, ammonium carbonates and sodium chloride. This solution is still saturated with the above-mentioned 198 kg. of ammonium chloride.

The carbonation of this solution in the vessel II causes the precipitation of about 200 kg. of sodium bicarbonate corresponding to almost the whole of the 140 kg. of sodium chloride freshly introduced at the beginning of the operation.

The above-mentioned 94 kg. of NaCl do not take any active part in the reaction and are once and for all introduced at the first cycle operation, after which the whole of the sodium chloride employed, that is to say, 140 kg. per cycle and per cubic meter are transformed into bicarbonate, while the 94 kg. remain in the circulating solution.

The precipitation of sodium bicarbonate entails an impoverishment of the solution in water. This can be advantageously compensated for by an addition of wash water coming from a preceding operation.

After filtration of the sodium bicarbonate precipitated, there is found again in solution the 94 kg. of NaCl 190 kg. of trimethylamine chloride and 198 kg. of ammonium chloride started with.

*Example 2*

There is introduced into a vessel I a solution containing per cubic meter, 600 kg. of mono di and trimethyl-ammonium nitrates, 190 kg. of $NH_4Cl$ or its equivalent 500 kg. of double nitrate of amine and ammonium.

There is added to this solution 210 kg. of sodium chloride and neutral ammonium carbonate in the form of $NH_3$ and $CO_2$, and 190 kg. of ammonium chloride, corresponding to the 210 kg. of sodium chloride introduced, are precipitated. All the sodium introduced is made soluble in the form of nitrate. This solution is carbonated in the vessel II by injection of $CO_2$ and there is obtained 300 kg. of bicarbonate of sodium. As before the loss of water is compensated by means of washing water. The solid ammonium chloride precipitated in the vessel I can be treated with lime in a vessel III and the ammonia obtained can be re-introduced into the cycle in the vessel I at the same time as the regenerated solution obtained after filtration of the bicarbonate of sodium in the vessel II. This regenerated solution contains the salts of amines and ammonia started with.

The final treatment with $CO_2$ in the vessel II of a solution containing besides salts of amines and ammonia, sodium in the form of a single salt (chloride or nitrate) procures a greater yield of sodium bicarbonate than by any known process, and the yield of sodium salt is of the order of 96 to 98% relative to the quantity of sodium salt employed.

Moreover, by the process described it is possible to effect methodical washings without loss of products and without necessitating at any moment either concentration or cooling or other thermal operation. Finally the ammonium chloride obtained is practically free from sodium chloride.

What I claim is:

1. A process for the manufacture of sodium bicarbonate comprising adding a soluble sodium salt and ammonium carbonates to a solution of a methylamine salt, carbonating the resulting solution of carbonates of ammonia and amine, and separating the precipitate of sodium bicarbonate formed.

2. A process for the manufacture of sodium bicarbonate comprising adding a soluble sodium salt and ammonium carbonates to a solution of methylamine salt kept saturated in the ammonium salt corresponding to said sodium salt, separating the precipitate of ammonium salt formed, carbonating the filtered solution of carbonates of ammonia and methylamine, and separating the precipitate of sodium bicarbonate formed.

3. A process for the manufacture of sodium bicarbonate comprising adding a soluble sodium salt and ammonium carbonates to a solution of a methylamine salt kept saturated in the ammonium salt corresponding to said sodium salt, separating the precipitate of ammonium salt formed, carbonating the filtered solution of carbonates of ammonia and methylamine, separating the precipitate of sodium bicarbonate formed, and reintroducing in the process the remaining solution.

4. A process for the manufacture of sodium bicarbonate comprising adding a soluble sodium salt and ammonium carbonates to a solution of methylamine salt kept saturated in the ammonium salt corresponding to said sodium salt, separating the precipitate of ammonium salt formed, carbonating the filtered solution of carbonates of ammonia and methylamine, separating the precipitate of sodium bicarbonate formed, treating with lime the ammonium salt precipitated, and reintroducing the ammonia liberated in the process with the remaining solution.

5. A process for the manufacture of sodium bicarbonate comprising adding sodium chloride and ammonium carbonates to a solution of a methylamine chloride saturated with ammonium chloride, separating the precipitate of ammonium chloride formed, carbonating the filtered solution containing carbonates of ammonia and methylamine and sodium chloride, separating the precipitate of sodium bicarbonate formed, and reintroducing in the process the remaining solution.

6. A process for the manufacture of sodium bicarbonate comprising adding sodium chloride and ammonium carbonates to a solution containing methylamine nitrate saturated with ammonium chloride, separating the precipitate of ammonium chloride formed, carbonating the filtered solution containing carbonates of ammonia and methylamine and sodium nitrate, separating the precipitate of sodium bicarbonate formed, and reintroducing in the process the remaining solution.

HENRI LAWARRÉE.